(No Model.)
J. SCHMIDT.
BARBED FENCE STRIP.
No. 368,014. Patented Aug. 9, 1887.
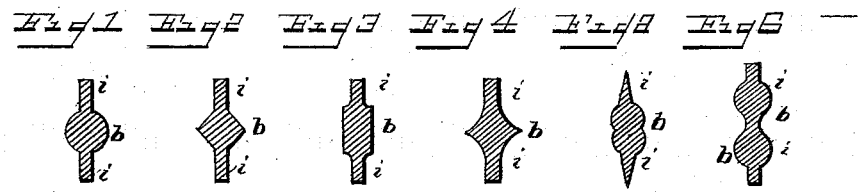
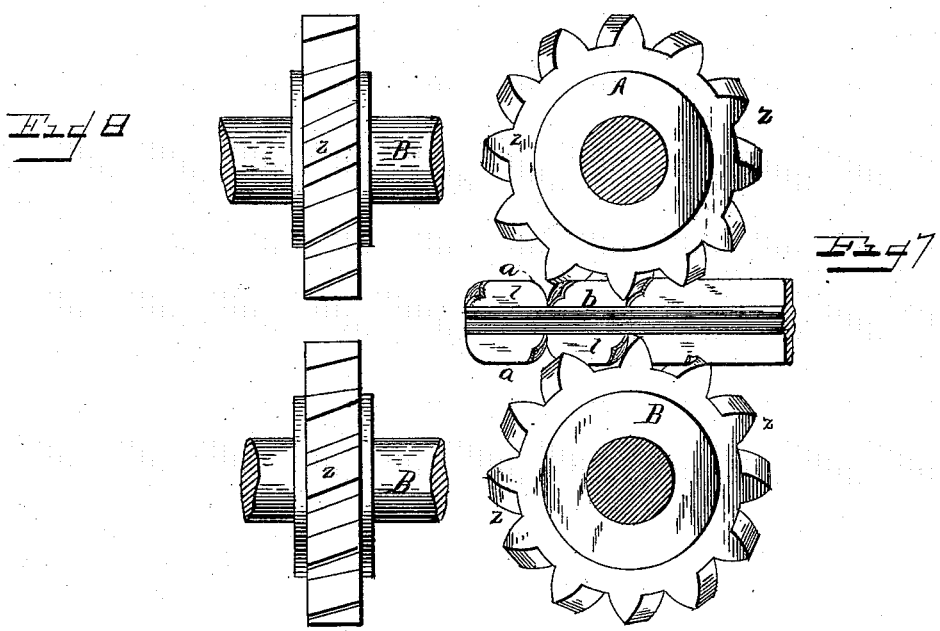
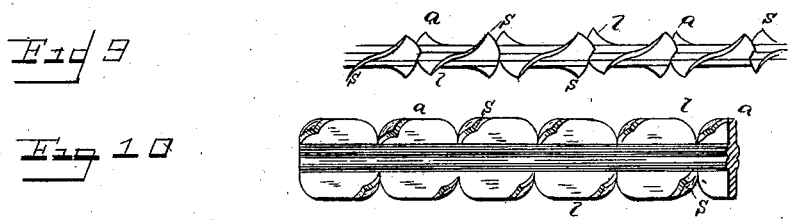
Witnesses
Franck L. Ouraud
Benj. G. Cowl
Inventor
Julius Schmidt,
By his Attorneys
Louis Bagger & Co.

UNITED STATES PATENT OFFICE.

JULIUS SCHMIDT, OF HAGEN, WESTPHALIA, PRUSSIA, GERMANY.

BARBED FENCE-STRIP.

SPECIFICATION forming part of Letters Patent No. 368,014, dated August 9, 1887.

Application filed March 7, 1887. Serial No. 230,005. (No model.) Patented in England August 19, 1886, No. 10,633.

*To all whom it may concern:*

Be it known that I, JULIUS SCHMIDT, a subject of the King of Prussia and Emperor of Germany, and a resident of the city of Hagen, in Westphalia, Kingdom of Prussia, Germany, have invented certain new and useful Improvements in Barbed Fence-Wire and Apparatus for Making the Same; and I do hereby declare that the following is a full, clear, and exact description of the invention, which will enable others skilled in the art to which it appertains to make and use the same, reference being had to the accompanying drawings, which form a part of this specification, and in which—

Figures 1, 2, 3, 4, 5, and 6 are transverse sectional views of various forms of strips used in the manufacture of my improved barbed wire. Fig. 7 is a side view of two rollers for forming the barbs upon the wire. Fig. 8 is an edge view of the same, and Figs. 9 and 10 are respectively an edge view and a side view of the wire formed by these rollers.

Similar letters of reference indicate corresponding parts in all the figures.

My invention has relation to manufacturing barbed fence-wire; and it consists in the improved apparatus for manufacturing such wire from strips of metal having longitudinal re-enforcing ribs, as hereinafter more fully described and claimed.

In the accompanying drawings the first six figures show sectional views of various forms of strips employed in the manufacture of this wire, and all these strips are formed with longitudinal re-enforcing ribs $b$ and with flanges $i$. These strips are passed through two rollers, A and B, having teeth or sharp cogs $z$ upon their peripheries, and as the strip is passed between the cogged or toothed peripheries of these rollers the flanges are cut to form the teeth or barbs $l$, having points $s$.

As the strip is passed between the rollers, the teeth are formed with points curved to both sides, as shown at A, as the rollers used have the faces of the teeth standing at an angle to the axis of the roller, the teeth of the upper roller having the inclines of the teeth at an angle to the teeth of the lower roller; and it will be seen that when the strip is passed between these rollers the teeth will cut into the flanges and bend the corners of the portions cut outward to opposite sides, the diagonally-opposite corners of the registering portions of the flanges at both sides of the ribs being bent in the same direction.

Having thus described my invention, I claim and desire to secure by Letters Patent of the United States—

1. In an apparatus for manufacturing barbed fence-wire, the combination of two rollers having teeth upon their peripheries, said teeth standing at an angle to the axis of the rollers and the teeth of one roller being at an angle to the teeth of the other roller, said rollers being adapted to have a piece of metal passed between them upon its edge, the teeth upon one roller engaging with one edge of the strip and the teeth of the other roller engaging with the other edge of the strip.

2. As an article of manufacture, a strip of metal having its edges cut into barbs, the diametrically-opposite corners of the registering portions of the edges of both sides of the barbs being bent in the same direction.

In testimony that I claim the foregoing as my own I have hereunto affixed my signature in presence of two witnesses.

JULIUS SCHMIDT.

Witnesses:
 ANSON MAURS,
 B. ROI.